US012112662B2

(12) United States Patent
Kojima

(10) Patent No.: US 12,112,662 B2
(45) Date of Patent: Oct. 8, 2024

(54) VEHICLE DISPLAY CONTROL DEVICE FOR CONTROLLING DISPLAY COLOR OF CONTENT

(71) Applicant: TOYOTA JIDOSHA KABUSHIKI KAISHA, Aichi-ken (JP)

(72) Inventor: Motohiro Kojima, Okazaki (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 128 days.

(21) Appl. No.: 17/967,893

(22) Filed: Oct. 18, 2022

(65) Prior Publication Data

US 2023/0137121 A1 May 4, 2023

(30) Foreign Application Priority Data

Nov. 1, 2021 (JP) ................................ 2021-178882

(51) Int. Cl.
*G09G 3/00* (2006.01)

(52) U.S. Cl.
CPC ......... *G09G 3/001* (2013.01); *G09G 2320/02* (2013.01); *G09G 2320/0626* (2013.01); *G09G 2320/0666* (2013.01); *G09G 2320/0686* (2013.01); *G09G 2380/10* (2013.01)

(58) Field of Classification Search
CPC ............... G09G 3/001; G09G 2320/02; G09G 2320/0626; G09G 2320/0666
See application file for complete search history.

(56) References Cited

U.S. PATENT DOCUMENTS

| | | | | |
|---|---|---|---|---|
| 2011/0102483 | A1* | 5/2011 | Kanamori | B60K 35/00 345/7 |
| 2015/0168720 | A1* | 6/2015 | Oh | G02B 27/01 345/690 |
| 2016/0274658 | A1* | 9/2016 | Ogasawara | G09G 5/36 |
| 2017/0343809 | A1* | 11/2017 | Benesh | G09G 5/00 |
| 2020/0150432 | A1* | 5/2020 | Makino | G09G 5/38 |
| 2021/0269052 | A1* | 9/2021 | Seo | B60W 30/12 |

FOREIGN PATENT DOCUMENTS

| | | | | |
|---|---|---|---|---|
| JP | 201332030 | A | | 2/2013 |
| JP | 2013032030 | A | * | 2/2013 |
| JP | 201684020 | A | | 5/2016 |
| JP | 2016084020 | A | * | 5/2016 |

* cited by examiner

*Primary Examiner* — Terrell M Robinson
(74) *Attorney, Agent, or Firm* — HAUPTMAN HAM, LLP

(57) ABSTRACT

The display control ECU changes the display color of the content in accordance with the display content of the content when displaying the content at a position where the windshield glass of the vehicle is located by the AR glass. Further, when the display color of the content is other than white, the display control ECU sets the display luminance of the border of the content to a second predetermined value or more or sets the brightness of the border of the content to a third predetermined value or more. The display control unit, when the color of the display of the content is white, the display luminance of the border of the content is less than the second predetermined value or is larger than the second predetermined value fourth predetermined value, or the brightness of the border of the content is less than the third predetermined value.

10 Claims, 8 Drawing Sheets

THREE PRIMARY COLORS OF LIGHT (ADDITIVE COLOR)

VEHICLE DISPLAY CONTROL DEVICE FOR CONTROLLING DISPLAY COLOR OF CONTENT

CROSS-REFERENCE TO RELATED APPLICATION

This application claims priority to Japanese Patent Application No. 2021-178882 filed on Nov. 1, 2021, incorporated herein by reference in its entirety.

BACKGROUND

1. Technical Field

The present disclosure relates to a vehicle display control device.

2. Description of Related Art

Japanese Unexamined Patent Application Publication No. 2016-84020 (JP 2016-84020 A) describes a technique of determining, based on a first color as a background color of a display to be displayed on a display device and a second color of the display, whether a border to be displayed on the display device in a third color is necessary and controlling the display device based on the determination.

SUMMARY

The display range of the human machine interface (HMI) mounted on a vehicle has been initially limited to a display at a lower position on the instrument panel, such as a meter. However, in recent years, the display area has been enlarged from the bottom to the middle of the windshield glass due to the head-up display (HUD) or the like. Then, in the future, the display area is further enlarged up to a height equal to or higher than the line of sight of an occupant due to a progress of the display technology and utilization of the extended reality (XR) technology such as augmented reality (AR) and mixed reality (MR). For example, it has been considered to superimpose and display the content such as information related to an object outside the vehicle.

However, when the display range in the HMI is enlarged upward and the content is superimposed on the surrounding environment, the color, brightness, etc. of the surrounding environment (background) including the natural environment such as sky, clouds, dusk, and surrounding vehicles and buildings may change from time to time. The technique described in JP 2016-84020 A detects a background color. The technique described in JP 2016-84020 A changes the color of the border to a color different from the background color and the display color of the content. Therefore, when the background color changes momentarily, the color of the border changes momentarily in accordance with the change, and thus, there is room for improvement in terms of visibility.

The present disclosure has been made in consideration of the above fact, and an object thereof is to provide a vehicle display control device capable of improving visibility of a display.

A vehicle display control device according to a first aspect includes a display control unit that changes, at a position where a glass of a vehicle is provided, a display color of a content in accordance with a detail of the content to be displayed, and of the content and a border of the content, sets a display luminance of at least the border of the content to be a first predetermined value or higher, or, when the display color is other than white, sets the display luminance of the content to be a second predetermined value or higher or a brightness of a color of the border of the content to be a third predetermined value or higher, or when the display color is white, sets the display luminance of the border of the content to be less than the second predetermined value or to be a fourth predetermined value or higher, the fourth predetermined value being larger than the second predetermined value, or the brightness of the color of the border of the content to be less than the third predetermined value.

According to the first aspect, the display color of the content is changed in accordance with the detail of the content to be displayed. Further, according to the first aspect, of the content and the border of the content, the display luminance of at least the border of the content is set to be the first predetermined value or higher. In this case, a luminance ratio between at least the border of the content and the background color is secured. Therefore, even when the background color changes, the visibility of at least the border of the content is ensured. Further, according to the first aspect, when the display color is other than white, the display luminance of the border of the content is set to be the second predetermined value or higher, or the brightness of the border of the content is set to be the third predetermined value or higher. Further, according to the first aspect, when the display color is white, the display luminance of the border of the content is set to be less than the second predetermined value or to be the fourth predetermined value that is larger than the second predetermined value or higher, or the brightness of the border of the content is set to be less than the third predetermined value. In this case, regardless of whether the display color of the content is white, the luminance ratio between the content or the background color and the border of the content is secured, or the difference in brightness between the display color of the content and the color of the border of the content becomes large. Therefore, even when the background color changes, visibility of at least one of the content and the border of the content is ensured. Further, according to the first aspect, even when the background color changes momentarily, the color of the border of the content is not changed in accordance with the change. Therefore, the visibility is improved. Accordingly, according to the first aspect, visibility of the display can be improved.

According to a second aspect, in the first aspect, the display control unit displays the content and the border of the content within a range including a range equal to or higher than a height of an eye of an occupant.

As in the second aspect, when the content and the border of the content are displayed within the range that is equal to or higher than the height of the eye of the occupant, the background color is often blue or red depending on conditions such as time and weather, as compared with the case where the content and the border of the content are displayed within a range that is lower than the height of the eye. Therefore, according to the second aspect, it is possible to more effectively solve the issue of the present disclosure that the visibility of the display is improved.

According to a third aspect, in the first or second aspect, the display control unit causes an augmented reality (AR) glass or an augmented reality (AR) contact lens serving as a display device to display the content and the border of the content.

As in the third aspect, when the content and the border of the content are displayed by the AR glass or the AR contact lens, the occupant views various different directions. Therefore, according to the third aspect, it is possible to more effectively solve the issue of the present disclosure that the visibility of the display is improved.

According to a fourth aspect, in the first or second aspect, the display control unit causes a head-up display (HUD) serving as a display device to display the content and the border of the content.

The HUDs are widely used in vehicles. Therefore, according to the fourth aspect, the present disclosure can be applied to various vehicles on which the HUD is mounted.

The present disclosure achieves the effect that the visibility of the display can be improved.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
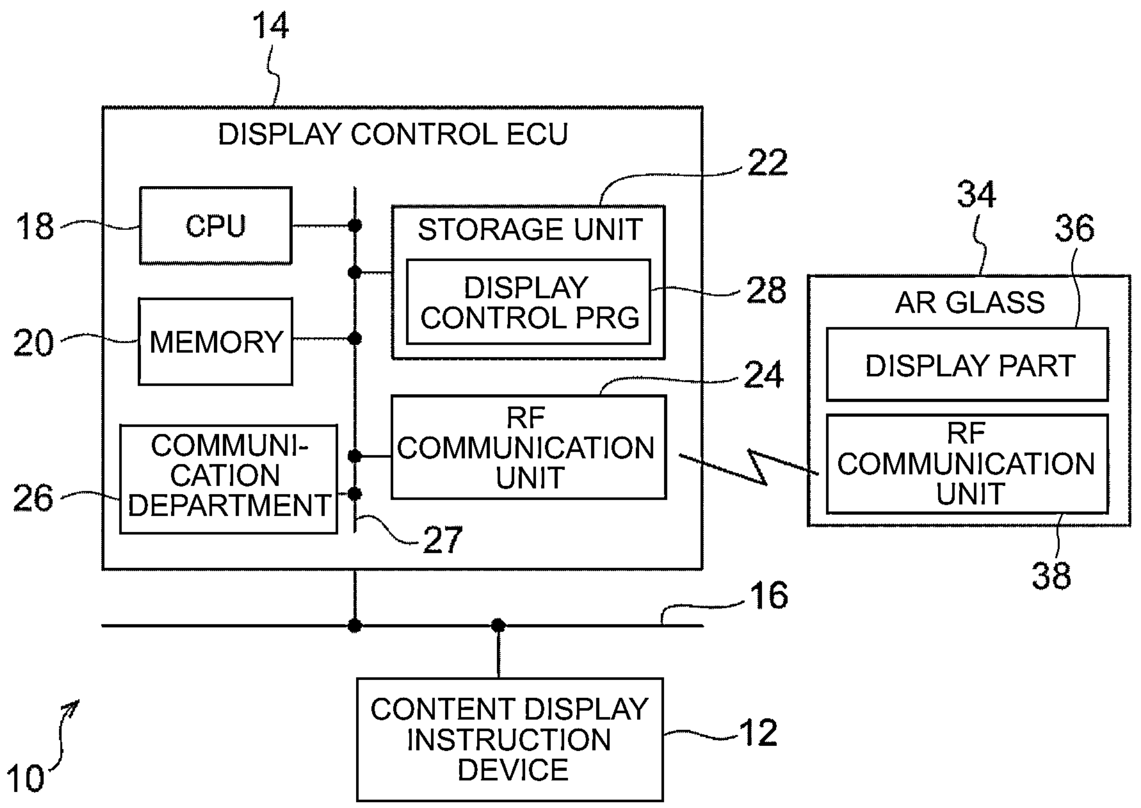
FIG. 1 is a schematic block diagram showing an in-vehicle system and an AR glass.

Hereinafter, an example of an embodiment of the present disclosure will be described in detail with reference to the drawings. FIG. 1 shows an in-board system 10 mounted on a vehicle, and an AR glass 34 as an example of a display device.

The in-vehicle system 10 includes a display control Electronic Control Unit (ECU) 14 for controlling the display of contents (texts, marks, etc.) on the AR glass 34, and a content display instruction device 12 for instructing the display control ECU 14 to display the contents on the AR glass 34. The display control ECU 14 and the content display instruction device 12 are mutually communicably connected via a system bus 16.

Content display instruction device 12 may include, for example, pedestrians present around the vehicle, a peripheral monitoring device for detecting and monitoring other vehicles by radar or the like. The peripheral monitoring device instructs the display of contents such as "pedestrian caution!" to the display control ECU 14 when, for example, the distance between the own vehicle and the pedestrian or another vehicle is equal to or less than a predetermined value.

The content display instruction device 12 may include, for example, a car navigation device. For example, the car navigation system instructs the display control ECU 14 to display contents such as "This Next Right Turn!" when, among the routes to the destination, the own vehicle is inserted at a point where the intersection is bent, etc. Further, for example, when the vehicle arrives at the destination shortly, the car navigation device instructs the display control ECU 14 to display contents such as "immediately!" or the like.

The content display instructing device 12 may include, for example, an information receiving device that receives weather information or the like from a server (not shown). The information receiving apparatus cooperates with, for example, a car navigation apparatus. Then, when the destination is set for the car navigation apparatus, the information receiving apparatus receives weather information of the destination from the server. In addition, the information receiving device instructs the display control ECU 14 to display contents such as "Nagoya fine weather!".

The display control ECU 14 includes a Central Processing Unit (CPU) 18 and a memory 20 such as a Read Only Memory (ROM) and a Random Access Memory (RAM). The display control ECU 14 includes a nonvolatile storage unit 22 such as a Hard Disk Drive (HDD) or a Solid State Drive (SSD), a wireless communication unit 24 that controls wireless communication with the AR glass 34, and a communication unit 26 that controls communication with the content display instruction device 12 in the in-vehicle system 10. CPU 18, the memory 20, the storage unit 22, the wireless communication unit 24 and the communication unit 26 are communicatively connected to each other via the inner bus 27. Incidentally, the display control ECU 14 is an example of a vehicle display control device.

Figure 2:
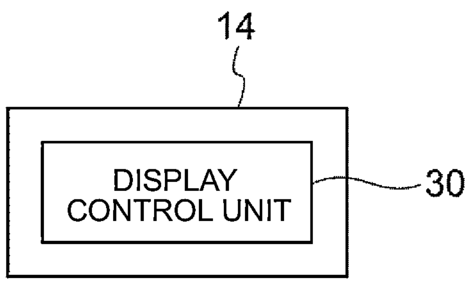
FIG. 2 is a functional block diagram of a display control ECU.

The storage unit 22 stores a display control program 28 in advance. When the display control programs 28 are read out from the storage unit 22, the display control ECU 14 is developed in the memory 20. The display control ECU 14 functions as the display control unit 30 shown in FIG. 2 by executing the display control programs 28 loaded in the memory 20 by CPU 18.

The display control unit 30 changes the display color of the content to a position where the glass of the vehicle is located, in accordance with the display content of the content instructed to be displayed by the content display instructing device 12. When the display color of the content is other than white, the display control unit 30 sets the display luminance of the border of the content to a second predetermined value or more or sets the brightness of the border of the content to a third predetermined value or more. In addition, when the display color of the content is white, the display control unit 30, the display luminance of the border of the content is less than the second predetermined value or is greater than the second predetermined value fourth predetermined value, or the brightness of the border of the content is less than the third predetermined value.

Figure 3:
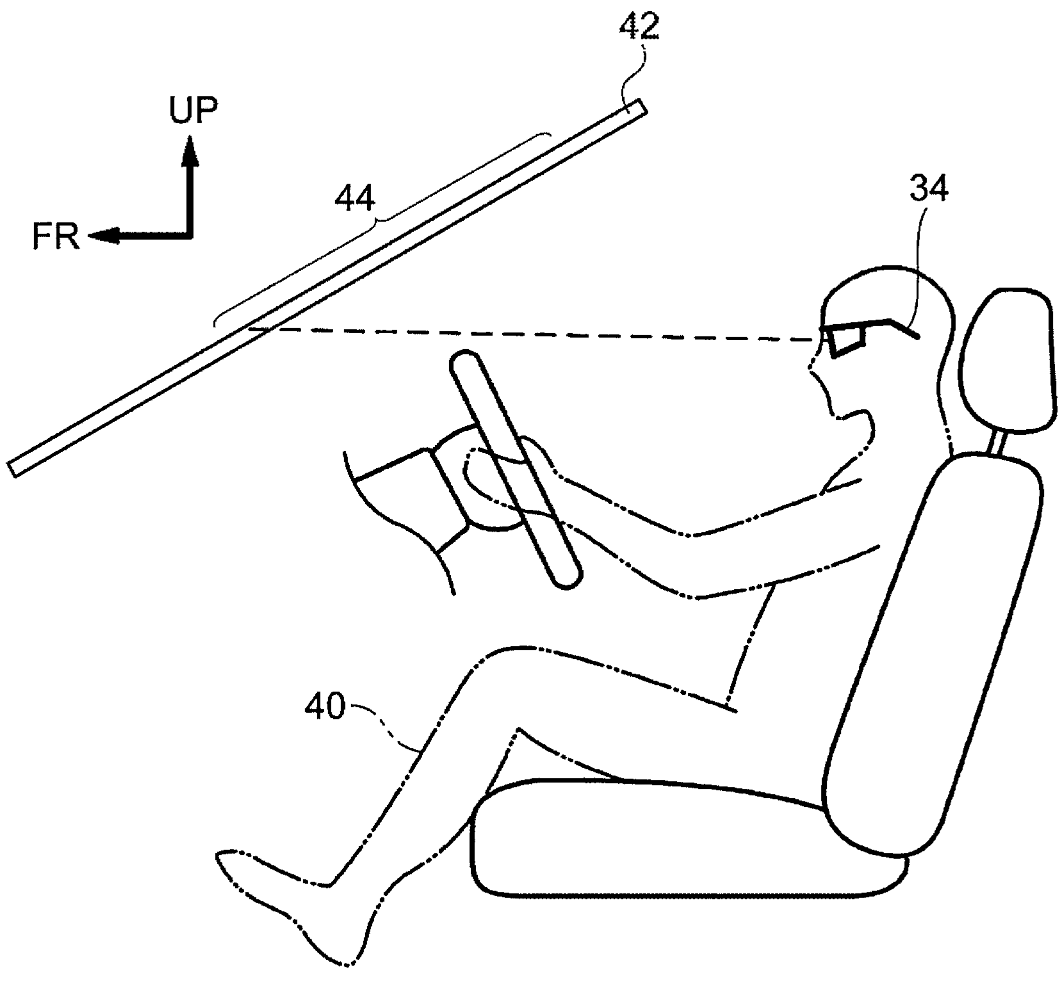
FIG. 3 is an image diagram showing an example of a display range by AR glass.

As also shown in FIG. 3, the AR glass 34 is an eyeglass type display device that is worn on the head of the occupant 40 riding in the vehicle. The AR glass 34 includes a display unit 36 capable of displaying any images, and a wireless communication unit 38 that controls wireless communication with a display control ECU 14. The display control unit 30 causes the display unit 36 to display the content and the border. As shown in FIG. 3, among the windshield glass 42 present in front of the occupant 40, in the display range 44 including a range that is equal to or higher than the height of the eyes of the occupant 40, as is displayed superimposed on the background, the content displayed on the display unit 36 and its border is perceived by the occupant 40.

Figure 4:
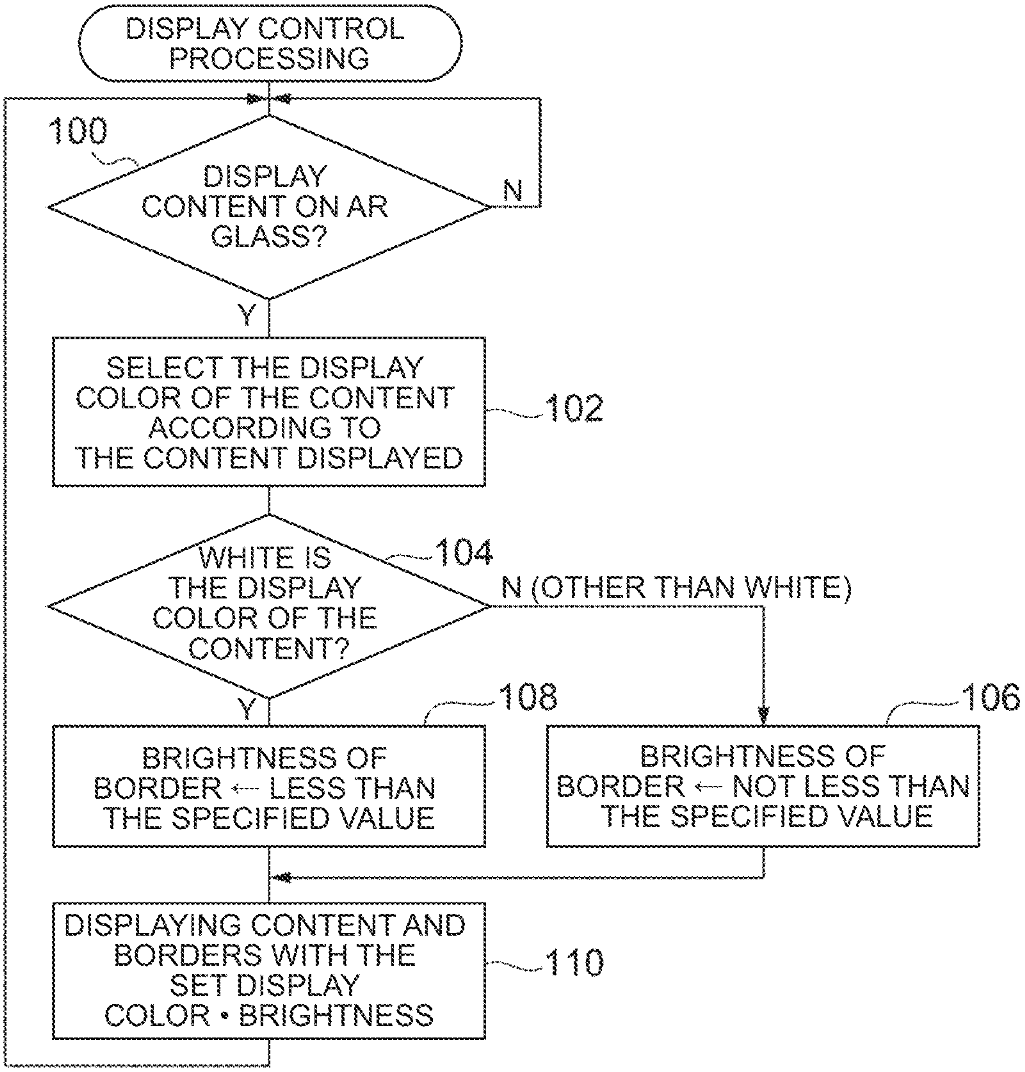
FIG. 4 is a flowchart showing a display control process executed in the display control ECU.

Next, as an operation of the present embodiment, the display control process executed by the display control ECU 14 while the ignition switch of the vehicle is on will be described referring to FIG. 4.

In step 100, the display control unit 30 determines whether or not the display of the content from the content display instructing device 12 to the AR glass 34 is instructed. If the determination of step 100 is negative, step 100 is repeated until the determination is affirmative. When the display of the content from the content display instructing device 12 to the AR glass 34 is instructed, the determination of step 100 is affirmative. Then, the display control process proceeds to step 102.

Figure 5:
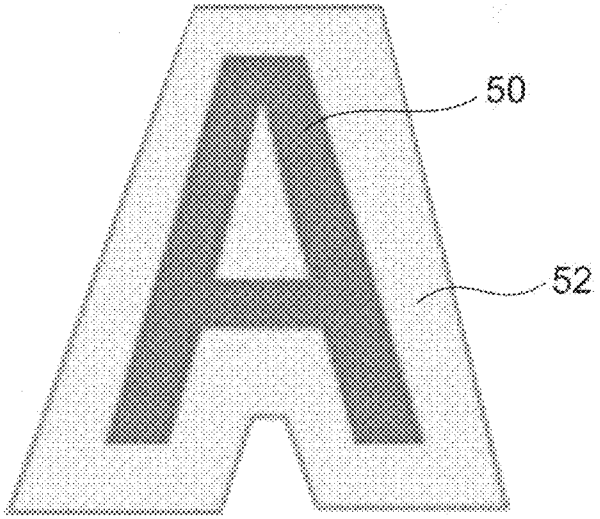
FIG. 5 is an image diagram showing an area of the content and an area of the boarder of the content.

In step 102, the display control unit 30 selects the display color of the content (the area 50 shown in FIG. 5) in accordance with the display content of the content instructed to be displayed on the AR glass 34 from the content display instructing device 12.

As an example, in the present embodiment, when the display content of the content has a high degree of urgency such as "pedestrian attention!" or the like, red (or orange) is selected as the display color of the content. In addition, in the present embodiment, in the case where the display content of the content has a low urgency level such as "Nagoya fine weather!" or the like, blue (or green) is selected as the display color of the content. In addition, in the present embodiment, in the case where the display content of the content is a content having a medium urgency level, such as "Immediate destination!" or the like, white is selected as the display color of the content.

In the next step 104, the display control unit 30 determines whether or not the display color of the content selected in step 102 is white. If the display color of the content selected in step 102 is other than white, the determination in step 104 is negative. Then, the display control process proceeds to step 106. In step 106, the display control unit 30 sets the brightness of the border of the content, i.e., the region 52 shown in FIG. 5, to a third predetermined value or more.

For example, when the display color of the content is red (or orange), the background color is red (or orange) because the weather is sunset. At this time, the color difference between the display color and the background color of the content becomes small. As a result, the visibility of the contents in the absence of the border deteriorates, as shown in the drawing 6A. On the other hand, in the present embodiment, when the display color of the content is red (or orange), the brightness of the border of the content is set to a third predetermined value or more. Therefore, the difference in brightness between the display color of the content and the color of the border of the content becomes large. Therefore, as shown in the drawing 6B, the visibility of the border of the contents is ensured. Then, the occupant 40 can grasp the content of the content.

Further, for example, in the case where the display color of the content is blue, if the background color is blue because the weather is fine, the color difference between the display color of the content and the background color becomes small. As a result, the visibility of the contents in the absence of the border deteriorates, as shown in the drawing 7A. On the other hand, in the present embodiment, when the display color of the content is blue (or green), the brightness of the border of the content is set to a third predetermined value or more. Therefore, the difference in brightness between the display color of the content and the color of the border of the content becomes large. Therefore, as shown in the drawing 7B, the visibility of the border of the contents is ensured. Then, the occupant 40 can grasp the content of the content.

Figure 6A:
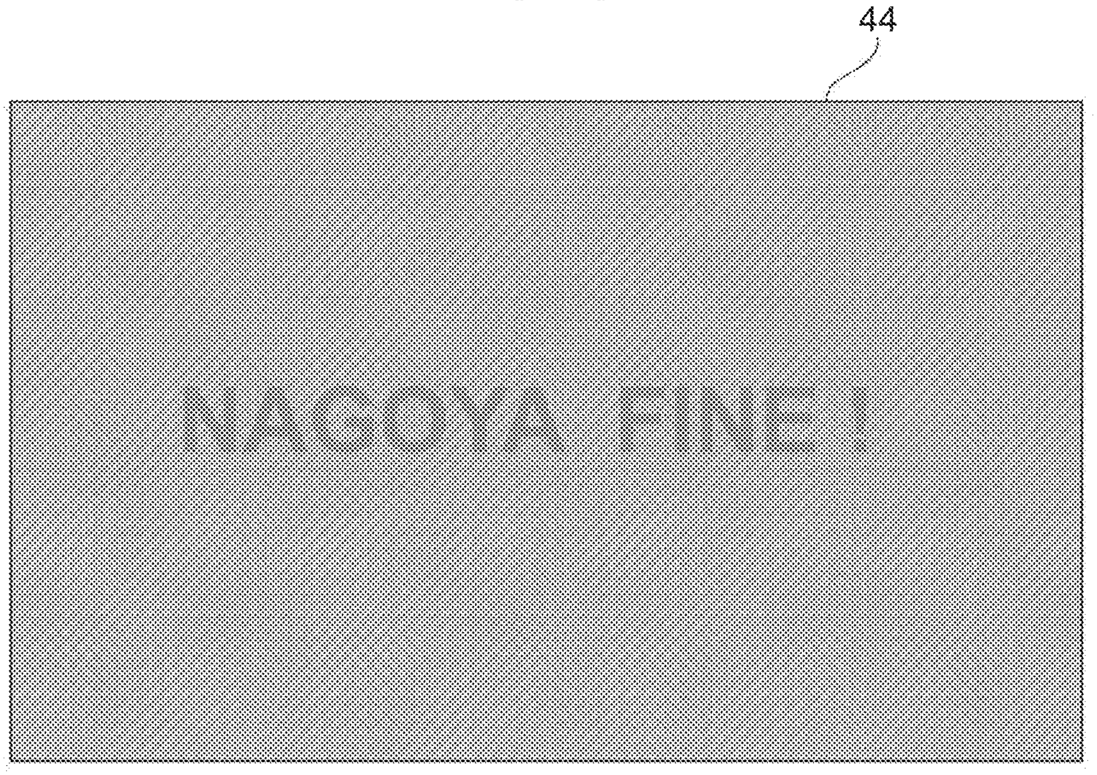
FIG. 6A is an image diagram showing a case where the color difference between the display color and the background color of the content is small.
Figure 6B:
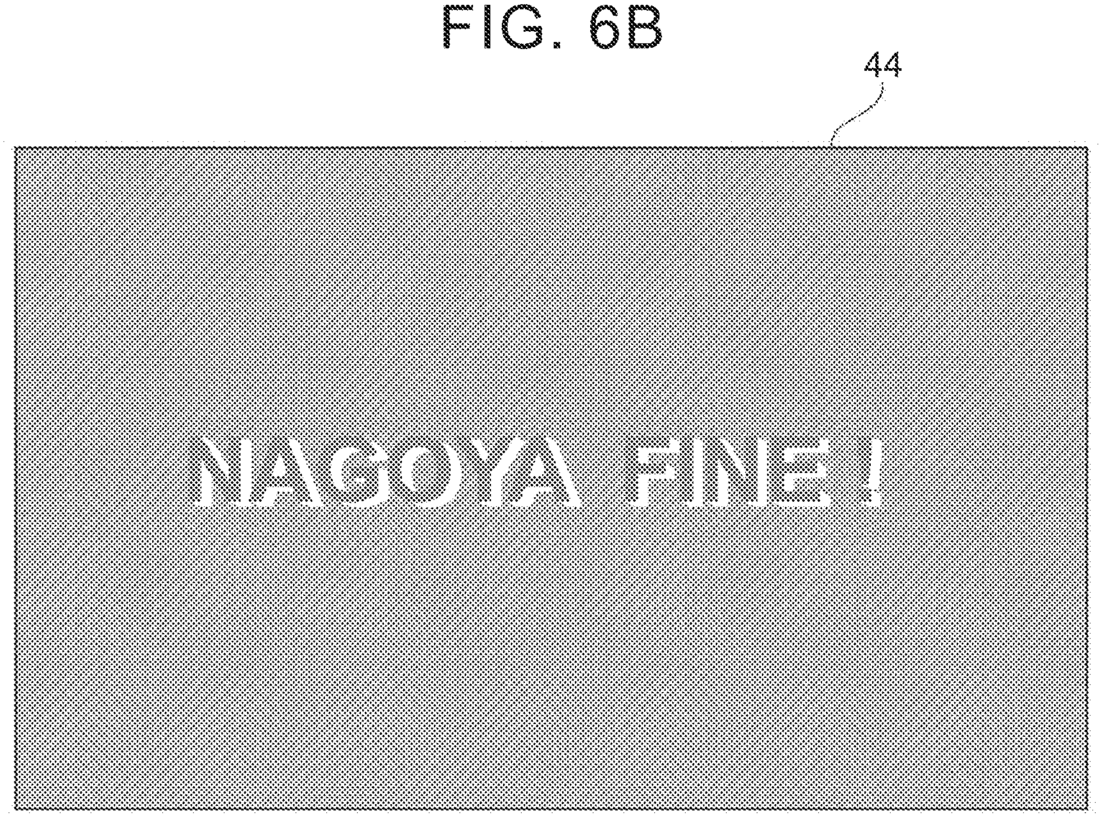
FIG. 6B is an image diagram showing the addition of borders to the situation shown in FIG. 6A.
Figure 7A:
FIG. 7A is an image diagram showing a case where the color difference between the display color and the background color of the content is small.
Figure 7B:
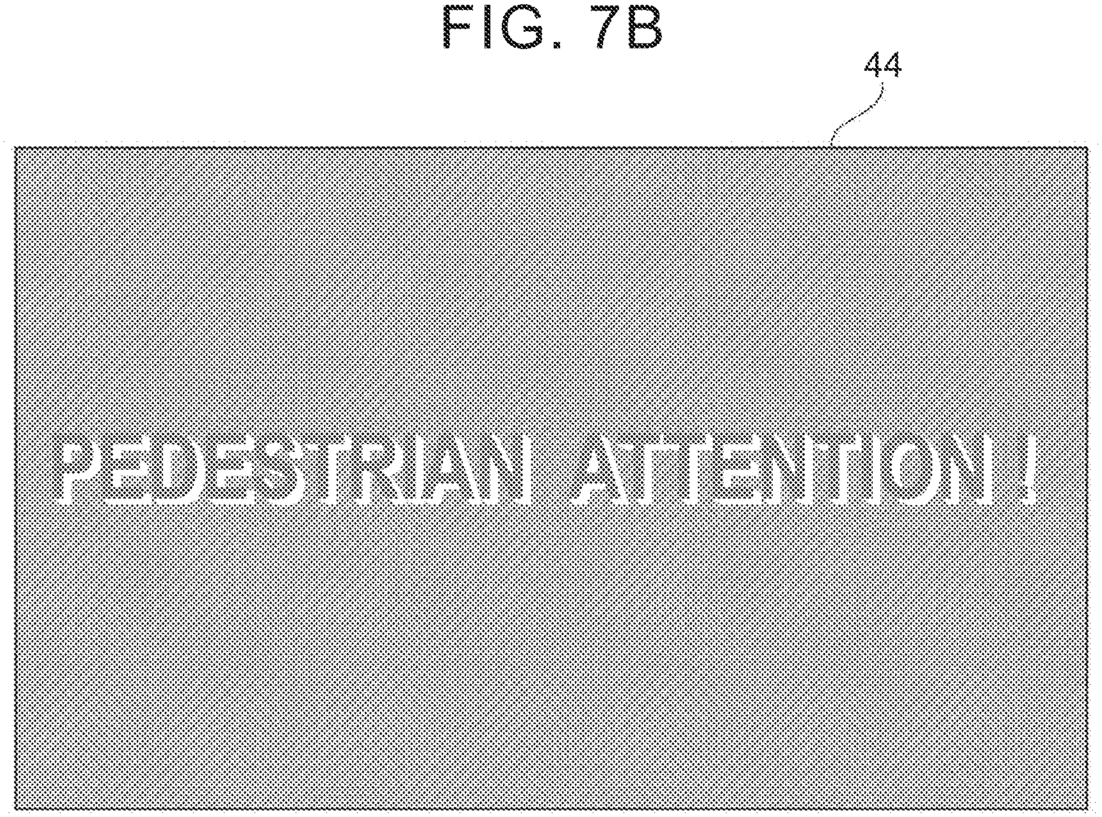
FIG. 7B is an image diagram showing the case of adding the border with respect to the state shown in FIG. 7A.

When the background color is changed from the state shown in FIG. 6B or the state shown in FIG. 7B so that the color difference from the color difference of the border of the content becomes small, the visibility of the border of the content is lowered. On the other hand, the visibility of the content itself is improved. Therefore, also in this case, the occupant 40 can grasp the content of the content.

Further, in the case where the display color of the content is other than white, instead of setting the brightness of the border of the content to the third predetermined value or more, in step 106, the display control unit 30 may set the display luminance of the border of the content to the second predetermined value or more. In this case, the luminance ratio between the content and the border of the content is ensured. Therefore, the visibility of the border of the content is ensured. Then, the occupant 40 can grasp the content of the content.

If the display color of the content selected in step 102 is white, the determination in step 104 is affirmative. Then, the display control process proceeds to step 108. In step 108, the display control unit 30 sets the brightness of the border of the content to be less than the third predetermined value.

Figure 8A:
FIG. 8A is an image diagram showing a case where the color difference between the display color and the background color of the content is small.

For example, in the case where the display color of the content is white, if the background color becomes white because the weather is fog or the like, the color difference between the display color of the content and the background color becomes small. As a result, as shown in FIG. 8A, the visibility of the contents in the absence of border is deteriorated. On the other hand, in the present embodiment, when the display color of the content is white, the brightness of the border of the content is set to be less than the third predetermined value. Therefore, the difference in brightness between the display color of the content and the color of the border of the content becomes large. Therefore, as shown in the drawing 8B, the visibility of the border of the contents is ensured. Then, the occupant 40 can grasp the content of the content.

Figure 8B:
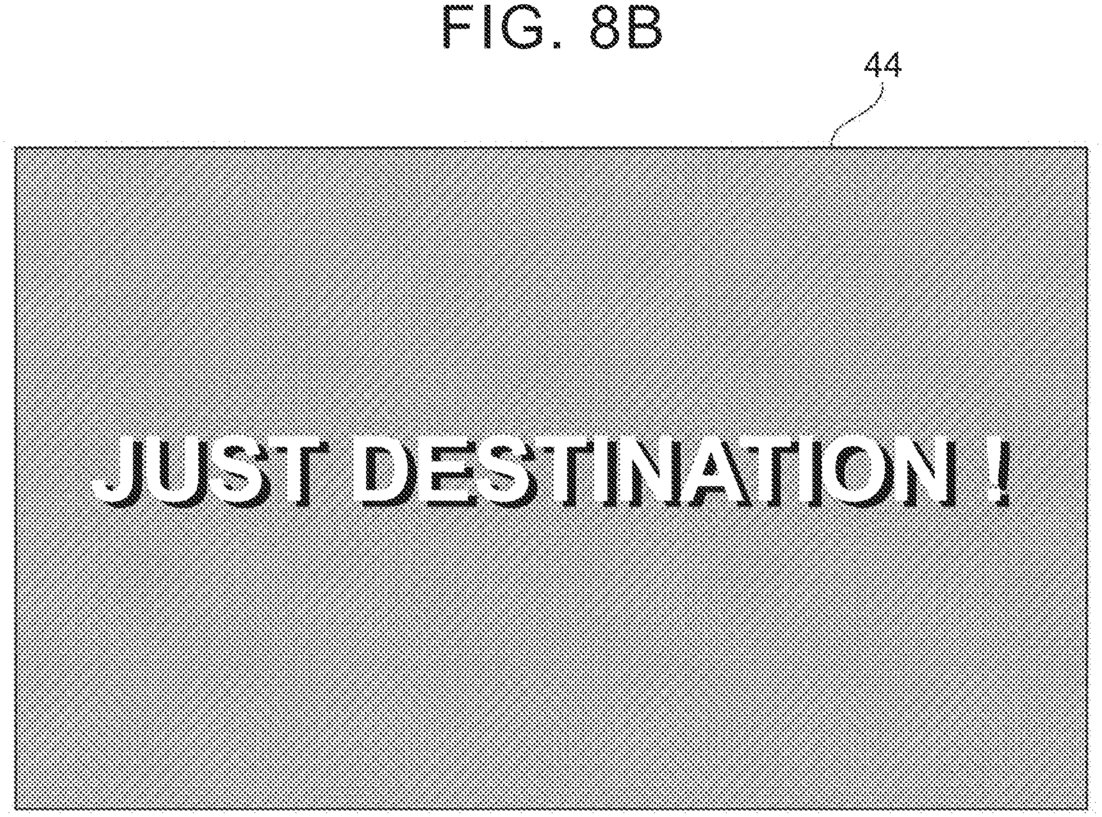
FIG. 8B is an image diagram showing an exemplary case of adding an edge with respect to the state shown in FIG. 8A.
Figure 8C:
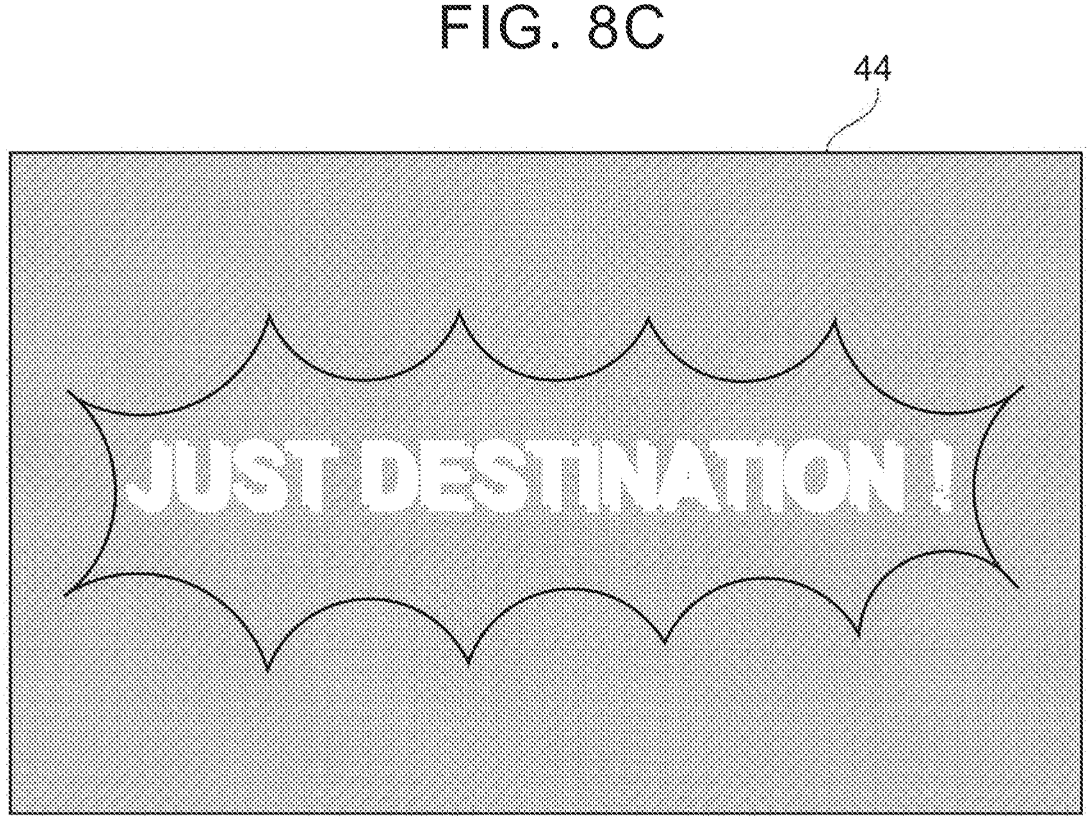
FIG. 8C is an image diagram showing another example when adding the border with respect to the state shown in FIG. 8A.

Incidentally, when the background color changes from the state shown in FIG. 8B so that the color difference with the color of the border of the content is reduced, the visibility of the border of the content is reduced. On the other hand, the visibility of the content itself is improved. Therefore, also in this case, the occupant 40 can grasp the content of the content.

Further, in the case where the display color of the content is white, instead of setting the brightness of the border of the content to be less than the third predetermined value, in step 108, the display control unit 30 may set the display luminance of the border of the content to be equal to or greater than the fourth predetermined value which is less than the second predetermined value or greater than the second predetermined value. In this instance, as shown in the drawing 8C, the brightness ratios of the background colors and the borders of the contents are ensured. Therefore, the visibility of the border of the content is ensured. Then, the occupant 40 can grasp the content of the content.

Figure 9:
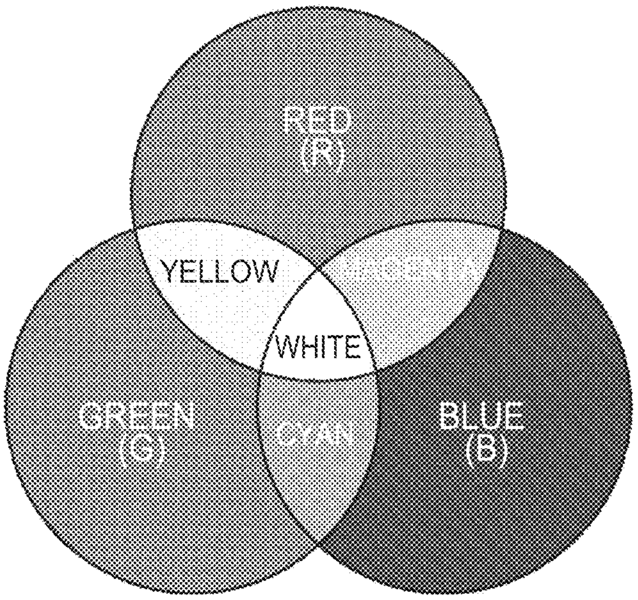
FIG. 9 is a conceptual diagram showing an RGB color model.

White is a mixture of three primary colors of light (so-called white noise) (see FIG. 9). As noted above, white increases the brightness of at least the border of the content. That is, by increasing the intensity of the white, even if a certain monochromatic light overlaps, the change in the white color of the border portion of the content is reduced. Even if the background color is white, it is possible to recognize at least the border portion of the content by securing a certain amount of white luminance of the border portion.

When the brightness of the border of the content is set in step 106 or step 108, the display control process proceeds to step 110. Then, in step 110, the display control unit 30 causes the AR glass 34 to display the content and the border with the set display color and brightness. When the process of step 110 is performed, the process returns to step 100. Steps 100 through 110 are then repeated.

As described above, in the present embodiment, the display control ECU 14 functions as the display control unit 30. When content is displayed at a position where the windshield glass 42 of the vehicle is located by the AR glass 34, the display control unit 30 changes the display color of the content in accordance with the display content of the content. When the display color of the content is other than white, the display control unit 30 sets the display luminance of the border of the content to a second predetermined value or more or sets the brightness of the border of the content to a third predetermined value or more. When the display color of the content is white, the display control unit 30 sets the display luminance of the border of the content to a fourth predetermined value or more that is less than the second predetermined value or greater than the second predetermined value, or sets the brightness of the border of the content to less than the third predetermined value.

This ensures the luminance ratio between the content and the border of the content regardless of whether the display color of the content is white or not, or increases the brightness difference between the display color of the content and the border of the content. Therefore, even if the background color changes, the visibility of at least one of the content and the border of the content is ensured. In addition, even when the background color changes momentarily, the color of the border of the content is not changed in accordance with the change. Therefore, the visibility is improved. Thus, the visibility of the display can be improved. Further, in the present embodiment, unlike the technique of JP 2016-84020 A, a configuration in which the background color is detected and the color of the border of the content is changed is unnecessary. This simplifies the configuration.

In the present embodiment, the display control unit 30 displays the content and the border of the content in a range including a range that is equal to or higher than the height of the eyes of the occupant 40. When the content and the border of the content are displayed in a range that is equal to or higher than the height of the eyes of the occupant 40, the background color is often blue or red depending on conditions such as time and weather, as compared with a case where the content and the border of the content are displayed in a range that is less than the height of the eyes. Therefore, the problem of the present disclosure of improving the visibility of the display can be more effectively solved.

In the present embodiment, the display control unit 30 displays the content and the border of the content by the AR glass 34. When content and content borders are displayed by the AR glass 34, the occupant 40 sees different directions. Therefore, the problem of the present disclosure of improving the visibility of the display can be more effectively solved.

In the above embodiment, a mode of switching the brightness or luminance of the border of the content according to whether or not the display color of the content is white has been described. However, the present disclosure is not limited thereto. In addition, at least the display luminance of the content and the content border may be equal to or higher than the first predetermined value. As a result, at least the luminance ratio between the border of the content and the background color is ensured. Therefore, even if the background color changes, at least the visibility of the border of the content is ensured. Accordingly, the visibility of the display can be improved.

Figure 10:
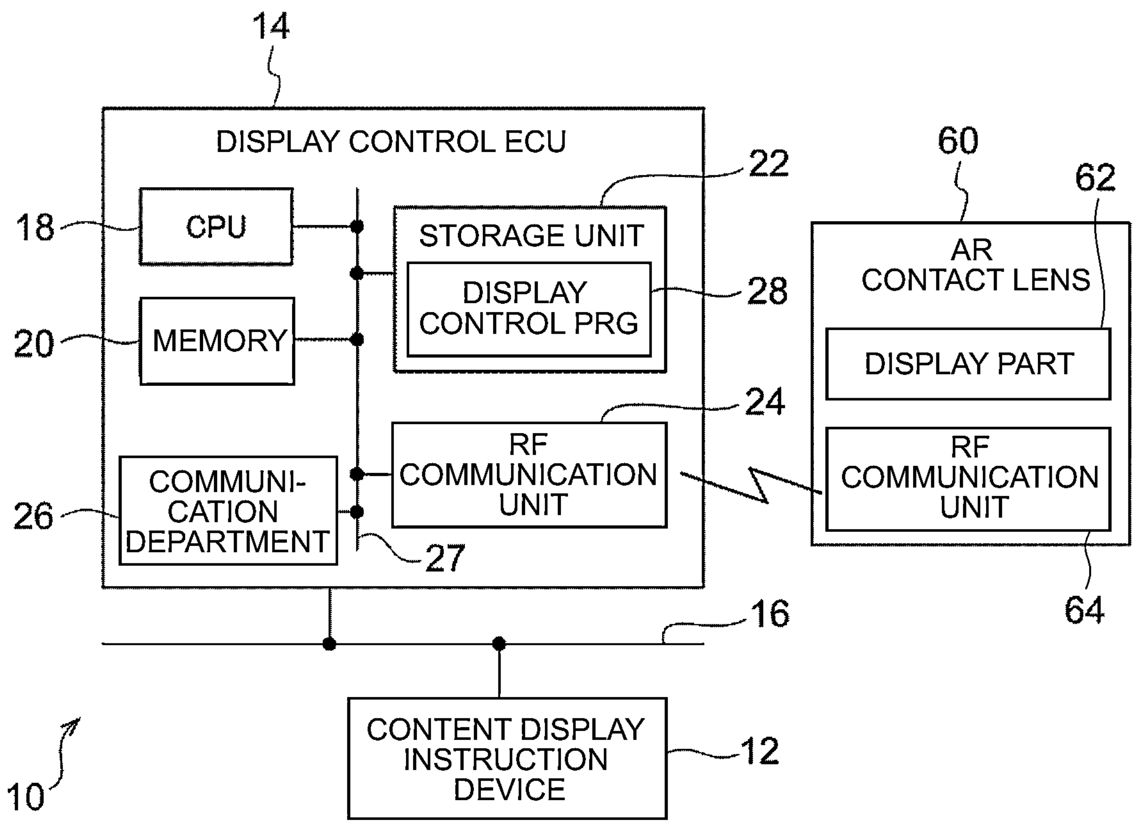
FIG. 10 is a schematic block diagram showing an in-vehicle system and an AR contact lens.

Further, in the above embodiment, an aspect in which the AR glass 34 is applied as the display device has been described. However, the present disclosure is not limited thereto. In addition, the display device may be, for example, an AR contact lens 60 shown in FIG. 10. The AR contact lens 60 is a contact lens type display device mounted on the eye of the occupant 40 riding in the vehicle. The AR contact lens 60 includes a display unit 62 capable of displaying any images, and a wireless communication unit 64 that controls wireless communication with a display control ECU 14. For the AR contact lens 60 as well, the content displayed on the display unit 62 and the border thereof are perceived by the occupant 40 as being superimposed on the background within the display range 44 (see FIG. 3) including a range that is equal to or higher than the eye height of the occupant 40 among the windshield glass 42 present in front of the occupant 40. The display device may be a HUD.

Further, in the above embodiment, the manner in which the display control program 28 is previously installed in the storage unit 22 has been described. However, the display control program 28 may be provided in a form recorded on a non-temporary recording medium such as an HDD, an SSD, or a DVD.

What is claimed is:

1. A vehicle display control device, comprising:

a display control unit configured to control a display of a content on a display device, wherein the content is superimposed on a background displayed in the display device, and at a position where a windshield glass of a vehicle is provided, change a display color of the content in accordance with a detail of the content to be displayed, wherein the display control unit is further configured to, in response to the display color being other than white and a color of the background of the content being same as the display color, set a display luminance of a border of the content to be a second predetermined value or higher, or a brightness of a color of the border of the content to be a third predetermined value or higher, and in response to the display color being white and the color of the background being white, set the display luminance of the border of the content to be less than the second predetermined value or to be a fourth predetermined value or higher, the fourth predetermined value being larger than the second predetermined value, or the brightness of the color of the border of the content to be less than the third predetermined value.

2. The vehicle display control device according to claim 1, wherein the display control unit is configured to cause the display device to display the content and the border of the content within a range including a range equal to or higher than a height of an eye of an occupant in the vehicle.

3. The vehicle display control device according to claim 1, wherein the display control unit is configured to cause an augmented reality glass or an augmented reality contact lens serving as the display device to display the content and the border of the content.

4. The vehicle display control device according to claim 1, wherein the display control unit is configured to cause a head-up display serving as the display device to display the content and the border of the content.

5. The vehicle display control device according to claim 1, wherein the display control unit is configured to select the display color of the content based on a degree of urgency.

6. The vehicle display control device according to claim 5, wherein the display control unit is configured to, in response to the degree of urgency being higher than a first predetermined degree, select the display color of the content to be red or orange, in response to the degree of urgency being equal to or higher than a second predetermined degree and lower than the first predetermined degree, select the display color of the content to be white, and in response to the degree of urgency being lower than the second predetermined degree, select the display color of the content to be blue or green.

7. The vehicle display control device according to claim 1, wherein the display control unit is configured to, in response to the display color being other than white and the color of the background of the content being same as the display color, set the display luminance of the border of the content to be the second predetermined value or higher, and in response to the display color being white and the color of the background being white, set the display luminance of the border of the content to be less than the second predetermined value or to be the fourth predetermined value or higher.

8. The vehicle display control device according to claim 1, wherein the display control unit is configured to, in response to the display color being other than white and the color of the background of the content being same as the display color, set the display luminance of the border of the content to be the second predetermined value or higher, and in response to the display color being white and the color of the background being white, set the brightness of the color of the border of the content to be less than the third predetermined value.

9. The vehicle display control device according to claim 1, wherein the display control unit is configured to, in response to the display color being other than white and the color of the background of the content being same as the display color, set the brightness of the color of the border of the content to be the third predetermined value or higher, and in response to the display color being white and the color of the background being white, set the display luminance of the border of the content to be less than the second predetermined value or to be the fourth predetermined value or higher.

10. The vehicle display control device according to claim 1, wherein the display control unit is configured to, in response to the display color being other than white and the color of the background of the content being same as the display color, set the brightness of the color of the border of the content to be the third predetermined value or higher, and in response to the display color being white and the color of the background being white, set the brightness of the color of the border of the content to be less than the third predetermined value.

* * * * *